United States Patent Office 3,310,539
Patented Mar. 21, 1967

3,310,539
IMIDAZOLIDINE-2-THIONE DERIVATIVES
Lucien Convert, Thiais, and Raymond Fabre, Vincennes, France, assignors to Rhone-Poulenc S.A., Paris, France, a French body corporate
No Drawing. Filed Oct. 29, 1964, Ser. No. 407,886
Claims priority, application France, July 17, 1964, 982,101
12 Claims. (Cl. 260—79.5)

The present invention provides a new group of chemical compounds suitable for vulcanizing mixes of halogenated synthetic elastomers, more especially mixes based on chloroprene polymers.

It is known that these elastomers are simple to vulcanize with metal oxides alone such, for example, as the oxides of zinc, magnesium, and lead, or with mixed such oxides. However, under these conditions vulcanization progresses slowly and is incomplete so that the vulcanizates obtained have unsatisfactory technical properties.

On the other hand, it is known that the use of classic vulcanization accelerators, either by themselves or in mixtures, such as the guanidines and the thiurams, raises the vulcanization speed and improves the characteristic properties of the vulcanizates, but these accelerators are still incapable of achieving the desired level of vulcanization.

Other, more specific accelerators, have been suggested for the vulcanization of mixes containing chloroprene polymers, especially imidazolidine-2-thione, alkylated or cycloalkylated thioureas, triazine derivatives, thiosemicarbazides, thioxamides and cyclic polyamides.

The use of some of these compounds improves the properties of the vulcanizates substantially, but, quite frequently, this is accompanied by a lesser facility and safety in the handling of the mixes prior to vulcanization. Users in fact know very well the tendency of mixes, especially those which contain a thiourea, to undergo pre-vulcanization. Inconveniences of this kind may occur in the course of the diverse operations involved in the processing of the mix prior to vulcanization, and this may sometimes result in very appreciable losses of material.

It has now been found that the derivatives of imidazolidine-2-thione of the general formula:

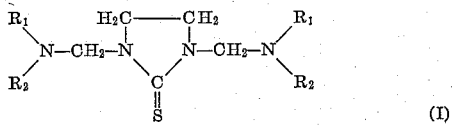

(I)

where $R_1$ and $R_2$ may be identical or different and each represents a lower alkyl or a cycloalkyl radical and $R_2$ may also be a hydrogen atom, or the grouping —$NR_1R_2$ represents a heterocyclic residue, are especially valuable accelerators for vulcanizing mixes based on a polychloroprene or a chloroprene copolymer. The lower alkyl radicals referred to above contain 1 to 5 carbon atoms and include, more especially, methyl, ethyl, propyl, isopropyl, n-butyl or isobutyl residues. The cycloalkyl radicals are preferably mononuclear cycloalkyl groups whose ring contains more than 4 carbon atoms, and this radical may be substituted, especially by lower alkyl groups such as methyl or ethyl. Specifically, there may be mentioned the cyclopentyl, cyclohexyl and cyclooctyl group.

The heterocyclic radicals represented by the grouping —$NR_1R_2$ include especially saturated mononuclear heterocyclic residues containing 5 or 6 ring atoms, one of which is the nitrogen atom joined to $R_1$ and $R_2$, and another of which may be oxygen or sulphur, the remaining atoms being carbon. The carbon atoms of these heterocyclic residues may also carry substituents such as methyl or ethyl groups. Specifically, there may be mentioned the morpholino and the piperidino group.

The compounds of Formula I are new and are very valuable accelerators for the vulcanization of chloroprene polymers. The chloroprene polymers which may be used are homopolymers of chloroprene and copolymers containing at least 40% of chloroprene residues, obtained by copolymerizing chloroprene with one or several co-monomers, such as acrylonitrile, butadiene, isoprene, dichloro-2,3-butadiene or styrene. The manufacture of chloroprene polymers of the kind concerned in the present invention has been described in various publications, more especially in "Synthetic Rubber," John Wiley and Sons, New York, pages 767 to 793 (1954).

The new accelerators may be used in amounts varying according to the individual polymer concerned, or the mix to be treated, or the special desired results. In general, the amount used is advantageously from 0.5 to 5 parts by weight for every 100 parts by weight of the chloroprene polymer. The unvulcanized mixes, containing one or more compounds of Formula I, are within the scope of the invention.

The vulcanizates obtained have in general outstanding mechanical properties. Their surface is free from blemishes, which is not always the case with known accelerators.

On the other hand, the use of the new accelerators is considerably facilitated by the fact that the crude mixes have a thermostability much greater than that of any mix used in the past, without this improved stability in any way slowing down the vulcanization rate at the temperatures at which the latter is performed.

The vulcanization operation is conducted at the conventional temperatures, preferably within the range from 120° to 200° C. and, as mentioned above, it proceeds very rapidly.

The products of the Formula I can be prepared, in accordance with a feature of the invention, by reacting 2 mols of formaldehyde with 1 mol of imidazolidine-2-thione and 2 mols of an amine of the formula $HNR_1R_2$. The reaction can be represented as follows:

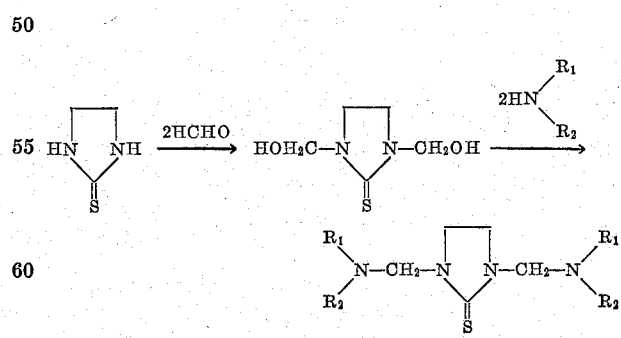

or

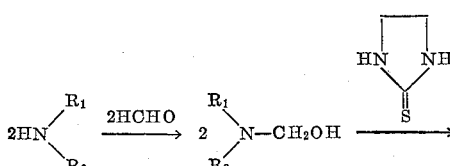

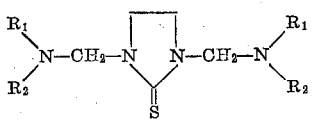

The process is very simple to perform by adding formalin to a mixture of imidazoline-2-thione+amine in water at room temperature (15° to 25° C.) or with gentle heating, for example at about 50° C.

The following examples illustrate the invention.

*Example 1*

51 g. (0.5 mol) of imidazoline-2-thione are made into a paste with a small amount of water, and the product is then dispersed in 300 cc. of water; 85 g. (1 mol) of piperidine are added and, at a temperature of 25° C., there are gradually added with stirring within ½ an hour 101 g. of formalin (corresponding to 1 mol of formaldehyde). Towards the end of the addition of formalin the temperature rises to 38° C. The batch is heated for 7 hours at 50° C., then cooled, filtered, and the filter residue is washed with water and dried in a ventilated drying oven at 50° C. In this manner there are obtained 143 g. of crude N,N'-bis(piperidinomethyl)imidazolidine-2-thione melting at 127° C. which is recrystallised from a hot solution in 400 cc. of acetone, and then allowed to cool to 15° C. The crystalline product is isolated by filtration, washed with 2×50 cc. of acetone cooled to 15° C., and dried, to yield 136 g. (=92% of theory) of recrystallised product melting at 127° C.

*Example 2*

The procedure described in Example 1 is repeated, except that piperidine is replaced by 1 mol of morpholine, to yield N,N'-bis(morpholinomethyl)imidazolidine-2-thione, melting at 158° C.

*Example 3*

The procedure described in Example 1 is repeated, except that the temperature during the condensation is kept at 25° C. and the following products are manufactured:

N,N'-bis(dimethylaminomethyl)imidazolidine-2-thione (isolated by extraction with chloroform), melting at 44° C.;
N,N'-bis(diethylaminomethyl)imidazolidine-2-thione, liquid at room temperature;
N,N'-bis(diisopropylaminomethyl)imidazolidine-2-thione, melting at 84° C.;
N,N'-bis(dibutylaminomethyl)imidazolidine-2-thione, liquid at room temperature;
N,N'-bis(cyclohexylaminomethyl)imidazolidine-2-thione, melting at 68° C.; and
N,N'-bis(N-methyl-N-cyclohexylaminomethyl)imidazolidine-2-thione, melting at 64° C.

*Example 4*

The following four mixes are prepared under the usual conditions in a roller mixer:

TABLE 1

| Mix | 1 | 2 | 3 | 4 |
|---|---|---|---|---|
| Parts by weight: | | | | |
| Neoprene W | 100 | 100 | 100 | 100 |
| Phenyl-α-naphthylamine | 1 | 1 | 1 | 1 |
| Zinc oxide | 5 | 5 | 5 | 5 |
| Magnesium oxide | 4 | 4 | 4 | 4 |
| Imidazolidine-2-thione [1] | | 0.375 | | |
| N,N'-bis(piperidinomethyl)imidazolidine-2-thione | | | 1.1 | |
| N,N'-bis(morpholinomethyl)imidazolidine-2-thione | | | | 1.1 |

[1] A known accelerator used for comparison.

With each of these four mixes the scorching time according to Mooney is measured, whereupon the mixes are moulded in a press at 153° C. The scorching time and the properties of the vulcanizates are shown in the following table:

TABLE 2

| Mix | Scorching time according to Mooney at 130° C. in minutes | Vulcanisation time in minutes | Tensile strength, kg./cm.[2] | Modulus 600%, kg./cm.[2] | Elongation at rupture in percent | Shore hardness A | Appearance of surface |
|---|---|---|---|---|---|---|---|
| 1 | | | Not vulcanized after 90 minutes | | | | |
| 2 | 17 | 20 | 191 | 49 | 785 | 44 | Very slightly granular. |
| 2 | 17 | 40 | 187 | 64 | 745 | 45 | Very slightly granular. |
| 3 | 45 | 20 | 195 | 49 | 790 | 43 | Perfect. |
| 3 | 45 | 40 | 196 | 66 | 720 | 47 | Perfect. |
| 4 | 44 | 20 | 187 | 48 | 790 | 42 | Do. |
| 4 | 44 | 40 | 184 | 73 | 720 | 47 | Do. |

The numerical values of Table 2 prove the excellent properties of the vulcanizates obtained from the mixes 3 and 4, which contain accelerators of this invention, as well as the exceptional safety ensured by the new accelerators.

*Example 5*

The following four mixes are prepared under the usual conditions in an internal mixer. The vulcanization accelerators are finally added in a roller mixer.

TABLE 3

| Mix | 1 | 2 | 3 | 4 |
|---|---|---|---|---|
| Parts by weight: | | | | |
| Neoprene W | 100 | 100 | 100 | 100 |
| Black MPC | 20 | 20 | 20 | 20 |
| Black MT | 70 | 70 | 70 | 70 |
| Stearic acid | 0.75 | 0.75 | 0.75 | 0.75 |
| Octylphthalate | 15 | 15 | 15 | 15 |
| Zinc oxide | 5 | 5 | 5 | 5 |
| Magnesium oxide | 4 | 4 | 4 | 4 |
| Imidazolidine-2-thione [1] | | 1 | | |
| N,N'-bis(piperidinomethyl)imidazolidine-2-thione | | | 2.9 | |
| N,N'-bis(morpholinomethyl)imidazolindine-2-thione | | | | 2.9 |

[1] A known accelerator used for comparison.

With each of these four mixes the scorching time according to Mooney is measured, whereupon the mixes are moulded in a press at 153° C. The scorching time and the properties of the vulcanizates are shown in the following table:

TABLE 4

| Mix | Scorching time according to Mooney at 110° C. in mins. | Vulcanisation time in minutes | Tensile strength, kg./cm.² | Modulus 200%, kg./cm.² | Elongation at rupture in percent | Shore hardness A |
|---|---|---|---|---|---|---|
| 1 | 27 | 20 | 69 | 24 | 470 | |
|   |    | 40 | 83 | 35 | 370 | |
| 2 | 18½ | 20 | 159 | 120 | 275 | 70 |
|   |     | 40 | 162 | 140 | 245 | 72 |
| 3 | 52 | 20 | 157 | 85 | 350 | 63 |
|   |    | 40 | 161 | 100 | 320 | 67 |
| 4 | 54 | 20 | 156 | 84 | 360 | 64 |
|   |    | 40 | 159 | 105 | 310 | 65 |

The numerical values of Table 4 likewise show the good properties of vulcanizates prepared from mixes containing the new accelerators and their advantages insofar as the scorching safety is concerned.

*Example 6*

The following four mixes are prepared in a roller mixer under the conditions conventionally employed in the elastomer industry.

TABLE 5

| Ingredients, parts by weight | Mix | | | |
|---|---|---|---|---|
| | 1 | 2 | 3 | 4 |
| Neoprene W | 100 | 100 | 100 | 100 |
| Phenyl-α-naphthylamine | 1 | 1 | 1 | 1 |
| Magnesia | 4 | 4 | 4 | 4 |
| Zinc oxide | 5 | 5 | 5 | 5 |
| Imidazolidine-2-thione ¹ | | 0.375 | | |
| N,N'-bis(dimethylaminomethyl)-imidazolidine-2-thione | | | 0.81 | |
| N,N'-bis(dibutylaminomethyl)-imidazolidine-2-thione | | | | 1.44 |

¹ A known accelerator used for comparison.

With each of these four mixes the scorching time according to Mooney is measured, whereupon the mixes are moulded in a press at 153° C. The scorching time and the properties of the vulcanizates are shown in the following table:

*Example 7*

The following four mixes are prepared under the usual conditions in a Banbury internal mixer, the accelerator being finally incorporated in a roller mixer.

TABLE 7

| Ingredients, parts by weight | Mix | | | |
|---|---|---|---|---|
| | 1 | 2 | 3 | 4 |
| Neoprene W | 100 | 100 | 100 | 100 |
| Stearic acid | 0.5 | 0.5 | 0.5 | 0.5 |
| Black SRF | 29 | 29 | 29 | 29 |
| Magnesia | 4 | 4 | 4 | 4 |
| Zinc oxide | 5 | 5 | 5 | 5 |
| Imidazolidine-2-thione ¹ | | 1 | | |
| N,N'-bis(dimethylaminomethyl)-imidazolidine-2-thione | | | 2.16 | |
| N,N'-bis(diethylaminomethyl)-imidazolidine-2-thione | | | | 3.84 |

¹ A known accelerator used for comparison.

With each of these four mixes the scorching time according to Mooney is measured, whereupon the mixes are moulded in a press at 153° C. The scorching time and the properties of the vulcanizates are shown in the following table:

TABLE 8

| Mix | Mooney value ª in minutes at °C. | | | Vulcanizing time in minutes | Characteristics after Vulcanization | | | |
|---|---|---|---|---|---|---|---|---|
| | 100° | 121° | 130° | | Rupture, kg./cm.² | Modulus 200% kg./cm.² | Elongation in percent | Shore hardness A |
| 1 | | 58 | 40 | 20 | | | | |
|   | |    |    | 40 | 129 | 37 | 620 | |
| 2 | 17 | 9½ | 6½ | 20 | 204 | 70 | 405 | 63 |
|   |    |    |    | 40 | 208 | 83 | 360 | 63 |
| 3 | 16 | 9 | 6½ | 20 | 211 | 48 | 560 | 58 |
|   |    |   |    | 40 | 232 | 49 | 575 | 59 |
| 4 | 24 | 13 | 8½ | 20 | 222 | 44 | 560 | 55 |
|   |    |    |    | 40 | 216 | 50 | 595 | 57 |

ª Mooney value immediately after preparing the mix.

With each of these four mixes the scorching time according to Mooney is measured, whereupon the mixes are moulded in a press at 153° C. The scorching time and the properties of the vulcanizates are shown in the following table:

*Example 8*

The following four mixes are prepared under the usual conditions in a Banbury internal mixer, the accelerator being finally incorporated in a roller mixer.

TABLE 6

| Mix | Scorching time according to Mooney in minutes at ° C. | | | Vulcanizing time in minutes | Characteristics after Vulcanisation | | | | |
|---|---|---|---|---|---|---|---|---|---|
| | 121° | 130° | 150° | | Rupture, kg./cm.² | Modulus 600%, kg./cm.² | Elongation in percent | Shore hardness A | Appearance of surface |
| 1 | ª >60 | | | 20 | No vulcanization after 60 minutes | | | | |
|   |        | | | 40 | | | | | |
| 2 | ª 15 | ª 10 | ª 6 | 20 | 190 | 52 | 810 | 42 | Slightly granular. |
|   | ᵇ 13¼ |     |     | 40 | 174 | 66 | 740 | 41 | |
| 3 | ª 24 | ª 16 | ª 7¼ | 20 | 183 | 60 | 720 | 43 | Perfect. |
|   | ᵇ 19½ |     |      | 40 | 173 | 77 | 670 | 45 | |
| 4 | ª 24½ | ª 15½ | ª 7½ | 20 | 186 | 45 | 810 | 39 | Do. |
|   | ᵇ 22  |       |      | 40 | 184 | 52 | 780 | 41 | |

ª = Mooney value immediately after preparing the mix.   ᵇ = Mooney value after storing the mix for 15 days.

TABLE 9

| Ingredients, parts by weight | Mix | | | |
|---|---|---|---|---|
| | 1 | 2 | 3 | 4 |
| Neoprene W | 100 | 100 | 100 | 100 |
| Stearic acid | 0.75 | 0.75 | 0.75 | 0.75 |
| Black FT | 70 | 70 | 70 | 70 |
| Black EPC | 20 | 20 | 20 | 20 |
| Octylphthalate | 15 | 15 | 15 | 15 |
| Magnesia | 4 | 4 | 4 | 4 |
| Zinc oxide | 5 | 5 | 5 | 5 |
| Imidazolidine-2-thione [1] | | 1 | | |
| N,N'-bis(dimethylaminomethyl)-imidazolidine-2-thione | | | 2.16 | |
| N,N'-bis(dibutylaminomethyl)-imidazolidine-2-thione | | | | 3.84 |

[1] A known accelerator used for comparison.

With each of these four mixes the scorching time according to Mooney is measured, whereupon the mixes are moulded in a press at 153° C. The scorching time and the properties of the vulcanizates are shown in the following table:

TABLE 10

| Mix | Scorching time according to Mooney in minutes at ° C. | | | Vulcanizing time in minutes | Characteristics after Vulcanization | | | |
|---|---|---|---|---|---|---|---|---|
| | 110° | 121° | 130° | | Rupture, kg./cm.$^2$ | Modulus 200% kg./cm.$^2$ | Elongation in percent | Shore hardness A |
| 1 | a 86 | a 35 | | 20 | 32 | 20 | 525 | 59 |
| | | | | 40 | 78 | 29 | 490 | 60 |
| 2 | a 13 | a 9¼ | a 6 | 20 | 155 | 103 | 290 | 68 |
| | b 11 | | | 40 | 148 | 107 | 275 | 69 |
| 3 | a 16½ | a 9½ | a 6½ | 20 | 149 | 77 | 350 | 66 |
| | b 11½ | | | 40 | 148 | 77 | 350 | 67 |
| 4 | a 22¼ | a 13 | a 8 | 20 | 143 | 68 | 405 | 62 |
| | b 15 | | | 40 | 144 | 74 | 390 | 63 | a = Mooney value immediately after preparing the mix.   b = Mooney value after storing the mix for 15 days.

We claim:
1. A compound of the formula:

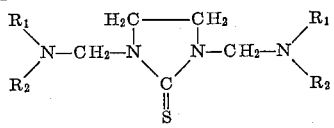

wherein $R_1$ and $R_2$ taken separately are each selected from the class consisting of alkyl and cycloalkyl and $R_2$ may also represent a hydrogen atom, and taken together with the adjacent nitrogen may represent a heterocyclic radical.

2. A compound of the formula:

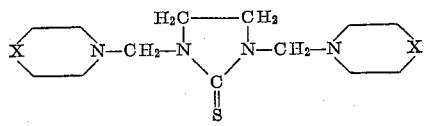

wherein X represents a member selected from the class consisting of methylene and an oxygen atom.

3. A compound of the formula:

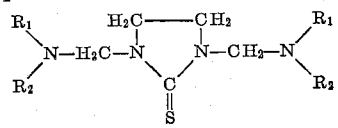

where $R_1$ and $R_2$ are each selected from the class consisting of alkyl and cycloalkyl, and $R_2$ may also represent a hydrogen atom.

4. N,N'-bis(piperidinomethyl)imidazolidine-2-thione.
5. N,N'-bis(morpholinomethyl)imidazolidine - 2 - thione.
6. N,N' - bis(dimethylaminomethyl)imidazolidine - 2-thione.
7. N,N' - bis(diethylaminomethyl)imidazolidine-2-thione.
8. N,N' - bis(dibutylaminomethyl)imidazolidine-2-thione.
9. N,N' - bis(cyclohexylaminomethyl)imidazolidine-2-thione.
10. N,N'-bis(N-methyl - N - cyclohexylaminomethyl)imidazolidine-2-thione.
11. A vulcanizable mix comprising a chloroprene polymer and, as vulcanization accelerator, at least one compound of the formula:

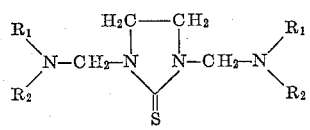

where $R_1$ and $R_2$ taken separately are each selected from the class consisting of alkyl and cycloalkyl and $R_2$ may also represent a hydrogen atom, and taken together with the adjacent nitrogen may represent a heterocyclic radical.

12. Process for producing a vulcanizate which comprises heating a vulcanizable mix comprising a chloroprene polymer and, as vulcanization accelerator, at least one compound of the formula:

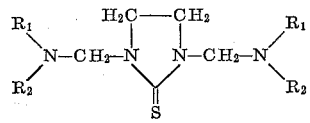

where $R_1$ and $R_2$ taken separately are each selected from the class consisting of alkyl and cycloalkyl and $R_2$ may also represent a hydrogen atom, and taken together with the adjacent nitrogen may represent a heterocyclic radical.

No references cited.

J. L. SCHOFER, *Primary Examiner.*

D. K. DENENBERG, *Assistant Examiner.*